(12) United States Patent
Li et al.

(10) Patent No.: US 9,443,528 B2
(45) Date of Patent: Sep. 13, 2016

(54) METHOD AND DEVICE FOR ELIMINATING ECHOES

(75) Inventors: Xingbo Li, Shenzhen (CN); Faguo Xu, Shenzhen (CN); Ting Liu, Shenzhen (CN); Qing Ma, Shenzhen (CN); Xiaoliang Li, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 0 days.

(21) Appl. No.: 14/400,289

(22) PCT Filed: Jun. 15, 2012

(86) PCT No.: PCT/CN2012/077022
§ 371 (c)(1),
(2), (4) Date: Nov. 10, 2014

(87) PCT Pub. No.: WO2013/166761
PCT Pub. Date: Nov. 14, 2013

(65) Prior Publication Data
US 2015/0124986 A1    May 7, 2015

(30) Foreign Application Priority Data

May 10, 2012   (CN) .......................... 2012 1 0145202

(51) Int. Cl.
| | |
|---|---|
| *H04B 3/20* | (2006.01) |
| *G10L 21/02* | (2013.01) |
| *H04B 3/23* | (2006.01) |
| *G10K 11/16* | (2006.01) |
| *H04M 9/08* | (2006.01) |

(52) U.S. Cl.
CPC .............. *G10L 21/02* (2013.01); *G10K 11/16* (2013.01); *H04B 3/23* (2013.01); *H04M 9/082* (2013.01)

(58) Field of Classification Search
CPC ................................ H04M 9/082; H04B 3/23
USPC ............ 381/66, 83, 93; 379/406.01–406.09, 379/406.12–406.14
See application file for complete search history.

(56) References Cited

U.S. PATENT DOCUMENTS

| 7,539,300 B1 * | 5/2009 | Benyassine ............ H04B 3/234 |
| | | 379/406.04 |
| 7,813,497 B2 * | 10/2010 | Brox ...................... H04B 3/234 |
| | | 379/406.08 |

(Continued)

FOREIGN PATENT DOCUMENTS

| CN | 101179294 A | 5/2008 |
| CN | 200610114419.5 | 5/2008 |

(Continued)

OTHER PUBLICATIONS

State Intellectual Property Office of the P.R. China. International Search Report dated Feb. 14, 2013. International Patent Application No. PCT/CN2012/077022. Name of Applicant: ZTE Corporation. Chinese and English Language Translation. 4 pages.

(Continued)

*Primary Examiner* — Disler Paul

(57) ABSTRACT

Provided are a method and device for eliminating echo. The method comprises: an echo path characteristic parameter of an echo signal is estimated; a source signal of the echo signal is taken as a reference signal, and an echo estimation signal is generated according to the echo path characteristic parameter; and the echo estimation signal is subtracted from a speech signal to be processed. The disclosure solves the problem in the related art that self-adaptation cannot be achieved when a returned near-end audio is suppressed, thus facilitating the enhancement of the speech quality of a conference and the improvement of user experience.

10 Claims, 7 Drawing Sheets

(56) References Cited

U.S. PATENT DOCUMENTS

| | | | |
|---|---|---|---|
| 2006/0018458 A1* | 1/2006 | McCree et al. | 379/406.01 |
| 2007/0189507 A1 | 8/2007 | Tittle et al. | |
| 2009/0041263 A1 | 2/2009 | Hoshuyama | |
| 2010/0054454 A1 | 3/2010 | Cao et al. | |
| 2010/0226492 A1 | 9/2010 | Takada | |
| 2011/0150067 A1 | 6/2011 | Takada | |
| 2011/0317564 A1 | 12/2011 | Saibi et al. | |
| 2013/0251167 A1* | 9/2013 | Gautama | H04B 3/23 381/66 |
| 2015/0332704 A1* | 11/2015 | Sun et al. | 381/66 |

FOREIGN PATENT DOCUMENTS

| | | |
|---|---|---|
| CN | 200710100270.X | 12/2008 |
| CN | 101346895 A | 1/2009 |
| CN | 200820213203.9 | 8/2009 |
| CN | 200880104273.3 | 7/2010 |
| CN | 101826892 A | 9/2010 |
| CN | 201010235614.X | 2/2011 |
| CN | 201010287069.9 | 4/2011 |
| CN | 201110048861.3 | 9/2011 |
| CN | 201010225201.3 | 1/2012 |
| CN | 201010240571.4 | 2/2012 |
| EP | 1 942 582 A1 | 9/2008 |
| JP | 2010206515 A | 9/2010 |
| JP | 4702371 B2 | 6/2011 |
| JP | 2011130170 A | 6/2011 |
| KR | 20080066049 A | 7/2008 |
| WO | WO 2007049643 A1 | 5/2007 |

OTHER PUBLICATIONS

Supplementary European Search Report for EP12876306 dated Nov. 17, 2015.

* cited by examiner

US 9,443,528 B2

METHOD AND DEVICE FOR ELIMINATING ECHOES

TECHNICAL FIELD

The disclosure relates to the field of communications, and in particular to a method and device for eliminating echoes.

BACKGROUND

Audio quality has always been a big problem troubling a teleconference. In a two-party conversation process, there are generally two channels between conference terminals, wherein a downlink reception channel sends speed signals transmitted from an opposite terminal to a loudspeaker to play out after speech decoding, reconstruction and amplification, and an uplink sending channel collects the speech signals of a near-end user through a microphone and then sends same to the opposite end of a conference after speech processing and coding. In the actual work, since the two parties of the conference have a need to speak at the same time, the loudspeaker and the microphone may work at the same time, as shown in FIG. 1. In a scenario that the two parties of the conference are speaking at the same time, since the limitation of the size of the conference terminal, a far-end speech signal played by the loudspeaker may be collected by a near-end microphone and transmitted to a far-end caller through the uplink sending channel; and since transmitting a far-end speech signal back to the far-end through the uplink sending channel has a certain time delay, at the moment, the far-end caller may hear his own speech, that is, an echo, and the longer the time delay, the more obvious the echo. Therefore, the echo has the greatest impact on speech calls of the VOIP type.

In order to overcome the impact of the echo on the speed calls, at present, there are many kinds of echo elimination technologies, for example, patent application files with the Patent Application Nos. CN200610114419.5, CN200710100270.X, CN200820213203.9, CN200880104273.3, CN201010225201.3, CN201010235614.X, CN201010240571.4, CN201110048861.3, etc. has disclosed the echo elimination technologies; however, a common point of the echo elimination technologies disclosed in the above-mentioned patent application files lies in a near-end participant eliminating the echo for a far-end user, which is conducive to prevent that a far-end participant hears his own voice being taken as the echo and returned to the far-end; although near-end echo elimination may be used at a near-end unit so as to make that the far-end participant cannot hear his own voice, in some cases, a far-end unit may have no available acoustic echo canceller to eliminate a far-end echo; in this case, since the acoustic coupling between the loudspeaker and the microphone at the far-end, the near-end participant will hear that his own voice returns to the near-end. Therefore, near-end echo elimination may benefit the far-end participant, but has no effect on preventing the near-end participant hearing a near-end audio which is taken as the echo and returned from the far-end.

The patent application file with the Patent Application No. CN201010287069.9 provides a method for suppressing near-end interference returned by the far-end at the near-end. The patent application file discloses involving the detection and suppression on the returned audio at the near-end, that is, detecting and suppressing the audio which is from the near-end, acoustic coupled at the near-end and returned to the near-end unit at the near-end of the conference. In order to determine a first energy output and a second energy output of each separated frequency band from the near-end audio sent by the near-end unit and the far-end audio received by the near-end unit, the near-end unit compares the first energy output and the second energy output of each frequency band in a certain time delay range, and detects the returning of the near-end audio sent in the received far-end audio on the basis of the comparison result. The comparison can use cross-correlation to obtain an estimated time delay for a further analysis of a near-end energy and a far-end energy. The near-end unit suppresses any returned near-end audio being detected by eliminating and weakening the far-end audio output at the loudspeaker thereof. The core idea thereof is: if the speech of the far-end participant is not detected at the near-end by a double-end talk detector unit, then the volume of the near-end loudspeaker would be eliminated or weakened so as to suppress the returned near-end audio. This method really could effectively suppress the returned near-end audio, but the method cannot adaptively suppress the returned near-end audio, and cannot timely control the volume of the near-end loudspeaker; in addition, the method for suppressing the returned near-end audio is to eliminate or weaken the volume of the near-end loudspeaker, and thus could result in the discontinuity of the far-end audio, thereby reducing the speech quality of the conference, and influencing the user experience.

Therefore, in the above-mentioned relevant art, when the returned near-end audio is suppressed, the far-end audio is incontinuous because the volume of the near-end loudspeaker may not be adaptively eliminated or weakened, thus reducing the speech quality of the conference and influencing the user experience.

SUMMARY

Provided are a method and device for eliminating echoes, so as to solve at least the problem that the returned near-end audio cannot be adaptively suppressed in the relevant art.

According to one aspect of the disclosure, provided is an method for eliminating echoes, the method comprises: estimating at least one echo path characteristic parameter of an echo signal; taking a source signal of the echo signal as a reference signal, generating an echo estimation signal according to the at least one echo path characteristic parameter; and subtracting the echo estimation signal from a speech signal to be processed.

Preferably, the speech signal to be processed comprises: a near-end speech signal and/or a speech signal transmitted from the far-end.

Preferably, before estimating the at least one echo path characteristic parameter of the echo signal, the above-mentioned method for eliminating echoes further comprises: obtaining a short time energy estimation value of the near-end speech signal and the short time energy estimation value of the speech signal transmitted from the far-end in preset duration; and determining a talk state mode according to a size of the short time energy estimation value of the near-end speech signal and a size of the short time energy estimation value of the speech signal transmitted from the far-end, wherein the talk state mode comprises a near-end talk and a far-end talk.

Preferably, determining the talk state mode according to the size of the short time energy estimation value of the near-end speech signal and the size of the short time energy estimation value of the speech signal transmitted from the far-end comprises: in the case that the short time energy estimation value of the near-end speech signal is greater than a preset multiple of the short time energy estimation value of the speech signal transmitted from the far-end in the preset duration, determining that the talk state mode is the near-end talk, and the signal to be processed is a speech signal transmitted from the far-end; determining that the talk state mode is the far-end talk, and the signal to be processed is a near-end speech signal in the case that the short time energy estimation value of the near-end speech signal is less than or equal to the preset multiple of the short time energy estimation value of the speech signal transmitted from the far-end in the preset duration.

Preferably, estimating the at least one echo path characteristic parameter of the echo signal comprises: obtaining a time delay of an echo signal in the speech signal to be processed; obtaining a power error between a power of the speech signal to be processed at a previous moment and a power of the speech signal to be processed at a current moment; and estimating the at least one echo path characteristic parameter of the echo signal according to the time delay and the power error.

Preferably, after the at least one echo path characteristic parameter of the echo signal is estimated according to the time delay and the power error, the above-mentioned method for eliminating echoes further comprises: in the case that it is determined the power error between the power of the speech signal to be processed at the previous moment and the power of the speech signal to be processed at the current moment is greater than a preset threshold, updating the at least one echo path characteristic parameter, wherein the echo path characteristic parameters comprises: an uplink echo path characteristic parameter and/or a downlink echo path characteristic parameter.

According to another aspect of the disclosure, provided is a device for eliminating echoes, the device comprises: an estimation component configured to estimate at least one echo path characteristic parameter of an echo signal; a generation component configured to take a source signal of the echo signal as a reference signal, and generate an echo estimation signal according to the at least one echo path characteristic parameter; and a processing component configured to subtract the echo estimation signal from a speech signal to be processed.

Preferably, the above-mentioned device for eliminating echoes further comprises: an acquisition component configured to obtain a short time energy estimation value of the near-end speech signal and a short time energy estimation value of the speech signal transmitted from the far-end in preset duration; and a determination component configured to determine a talk state mode according to a size of the short time energy estimation value of the near-end speech signal and a size of the short time energy estimation value of the speech signal transmitted from the far-end, wherein the talk state mode comprises a near-end talk and a far-end talk.

Preferably, the determination component comprises: a first determination unit configured to determine that the talk state mode is the near-end talk, and the signal to be processed is a speech signal transmitted from the far-end in the case that the short time energy estimation value of the near-end speech signal is greater than a preset multiple of the short time energy estimation value of the speech signal transmitted from the far-end in the preset duration; and a second determination unit configured to determine that the talk state mode is the far-end talk, and the signal to be processed is a near-end speech signal in the case that the short time energy estimation value of the near-end speech signal is not greater than the preset multiple of the short time energy estimation value of the speech signal transmitted from the far-end in the preset duration.

Preferably, the estimation component comprises: a first acquisition unit, configured to obtain the time delay of an echo signal in the speech signal to be processed; a second acquisition unit, configured to obtain a power error between a power of the speech signal to be processed at a previous moment and a power of the speech signal to be processed at a current moment; and an estimation unit, configured to estimate the at least one echo path characteristic parameter of the echo signal according to the time delay and the power error.

Preferably, the above-mentioned device for eliminating echoes further comprises: an update component, configured to, in the case that it is determined the power error between the power of the speech signal to be processed at the previous moment and the power of the speech signal to be processed at the current moment is greater than a preset threshold, update the at least one echo path characteristic parameter, wherein the echo path characteristic parameters comprises: an uplink echo path characteristic parameter and/or a downlink echo path characteristic parameter.

In the disclosure, the echo path characteristic parameter of the echo signal is estimated, the source signal of the echo signal is taken as the reference signal and the echo estimation signal is generated according to the echo path characteristic parameter, and the echo estimation signal is subtracted from a speech signal to be processed. Through the above solution, the echo path characteristic parameter of the echo signal is estimated timely so as to generate the echo estimation signal, and then the echo estimation signal is subtracted timely and adaptively from the speech signal to be processed so as to eliminate the echo, wherein the above-mentioned echo may either be a downlink echo or an uplink echo; meanwhile, in the disclosure, the purpose of eliminating the echo is achieved by subtracting the echo estimation signal from the speech signal to be processed; therefore, the problem of far-end audio discontinuity due to echo elimination by way of eliminating or weakening the volume of the near-end loudspeaker, thereby contributing to improve the speech quality of the conference, and improve the user experience.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the accompanying drawings.

DETAILED DESCRIPTION OF EMBODIMENTS

The disclosure is described below with reference to the accompanying drawings and embodiments in detail. Note that, the embodiments of the present application and the features of the embodiments can be combined with each other if there is no conflict.

Figure 1:
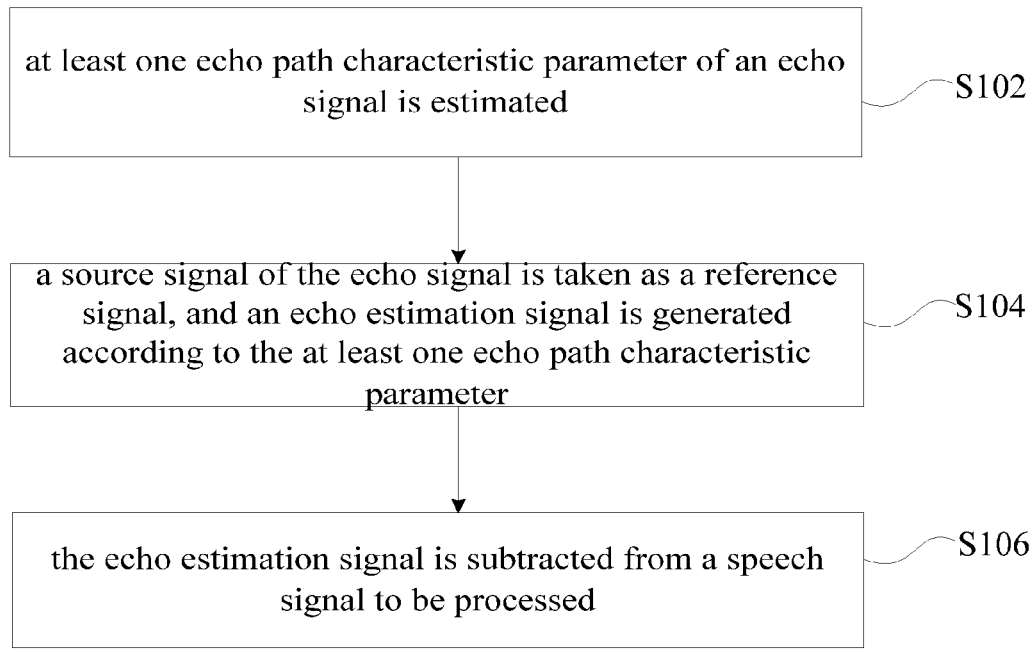
FIG. 1 is a flowchart of a method for eliminating echoes according to an embodiment of the disclosure.

This embodiment provides a method for eliminating echoes, as shown in FIG. 1, the method for eliminating echoes comprises steps S102-S106.

Step S102: at least one echo path characteristic parameter of an echo signal is estimated.

Step S104: a source signal of the echo signal is taken as a reference signal, and an echo estimation signal is generated according to the at least one echo path characteristic parameter.

Step S106: the echo estimation signal is subtracted from a speech signal to be processed.

In the present embodiment, the echo path characteristic parameter of the echo signal is estimated, the source signal of the echo signal is taken as the reference signal and the echo estimation signal is generated according to the echo path characteristic parameter, and finally the echo estimation signal is subtracted from the speech signal to be processed. Through the above solution, the echo path characteristic parameter of the echo signal is estimated timely so as to generate the echo estimation signal, and the echo estimation signal is subtracted from the speech signal to be processed so as to eliminate the echo, wherein the above-mentioned echo may either be a downlink echo or an uplink echo; meanwhile, in the disclosure, the purpose of eliminating the echo is achieved by subtracting the echo estimation signal from the speech signal to be processed; therefore, the problem of far-end audio discontinuity due to echo elimination by way of eliminating or weakening the volume of the near-end loudspeaker, thereby contributing to improve the speech quality of the conference, and improve the user experience.

In order to improve the practicability of this embodiment, in this preferred embodiment, the above-mentioned speech signal to be processed comprises: a near-end speech signal and/or a speech signal transmitted from the far-end.

In the above-mentioned preferred embodiment, the above-mentioned speech signal to be processed comprises: a near-end speech signal and/or a speech signal transmitted from the far-end, that is, both the elimination of an uplink echo and the elimination of a downlink echo may be completed, for example, when the speech signal to be processed is a near-end speed signal, the elimination of the uplink echo is completed, and when the speech signal to be processed is the speech signal transmitted from the far-end, the elimination of the downlink echo is completed; thus the elimination of the uplink echo and the downlink echo may be performed at the same time, the speech quality of the conference is effectively improved, and the practicability of this embodiment is improved.

In order to accurately estimate the echo path characteristic parameter of the echo signal, in this preferred embodiment, before estimating the echo path characteristic parameter of the echo signal, a short time energy estimation value of the near-end speech signal and the short time energy estimation value of the speech signal transmitted from the far-end in preset duration are obtained; and a talk state mode is determined according to a size of the short time energy estimation value of the near-end speech signal and a size of the short time energy estimation value of the speech signal transmitted from the far-end, wherein the talk state mode comprises a near-end talk and a far-end talk.

In the above-mentioned preferred embodiment, before the echo path characteristic parameter of the echo signal is estimated, a talk state mode is determined according to the size of the short time energy estimation value of the near-end speech signal and the size of the short time energy estimation value of the speech signal transmitted from the far-end, wherein the talk state mode comprises a near-end talk and a far-end talk, that is, after the current talk state mode is determined, the source signal of the echo signal may be determined, for example, when it is determined that the current talk state mode is the near-end talk, the source signal of the echo signal is a near-end speech signal, and when it is determined that the current talk state mode is the far-end talk, the source signal of the echo signal is a speech signal transmitted from the far-end. Therefore, when the talk state mode is determined, the source signal of the echo signal is determined, and thus the echo path characteristic parameter of the echo signal may be accurately estimated.

In order to accurately determine the talk state mode, in this preferred embodiment, a method for determining the talk state mode according to the size of the short time energy estimation value of the near-end speech signal and the size of the short time energy estimation value of the speech signal transmitted from the far-end is provided, for example, in the case that the short time energy estimation value of the near-end speech signal is greater than a preset multiple of the short time energy estimation value of the speech signal transmitted from the far-end in the preset duration, it is determined that the talk state mode is the near-end talk and the signal to be processed is a speech signal transmitted from the far-end; otherwise, it is determined that the talk state mode is the far-end talk, and the signal to be processed is the near-end speech signal.

In the above-mentioned preferred embodiment, it is determined that the talk state mode is the near-end talk and the signal to be processed is the speech signal transmitted from the far-end in the case that the short time energy estimation value of the near-end speech signal is greater than a preset multiple of the short time energy estimation value of the speech signal transmitted from the far-end in the preset duration; and it is determined that the talk state mode is the far-end talk and the signal to be processed is the near-end speech signal in the case that the short time energy estimation value of the near-end speech signal is not greater than the preset multiple of the short time energy estimation value of the speech signal transmitted from the far-end in the preset duration, thus accurately determining the talk state mode.

In order to improve the effect of echo elimination and accurately estimate the echo path characteristic parameter of the echo signal, in this preferred embodiment, a method for estimating the echo path characteristic parameter of the echo signal is provided, for example, a time delay of an echo signal in the speech signal to be processed is obtained; a power error between a power of the speech signal to be processed at the previous moment and a power of the speech signal to be processed at the current moment is obtained; and the echo path characteristic parameter of the echo signal is estimated according to the time delay and the power error.

In the above-mentioned preferred embodiment, the time delay of the echo signal in the signal to be processed and the power error between the power of the signal to be processed at the previous moment and the power of signal to be processed at the current moment are considered at the same time to estimate the echo path characteristic parameter of the echo signal. For example, when the talk state mode is the near-end talk, the speech signal to be processed is the speech signal transmitted from the far-end, and the source signal of the echo signal is the near-end speech signal. At this moment, estimating the echo path characteristic parameter of the echo signal needs to consider a time delay change and a signal attenuation change when the source signal of the echo signal changes into the echo signal, that is, the path characteristic parameter of the source signal of the echo signal in the process that the source signal of the echo signal is transmitted to the far-end through an uplink sending channel and then returned to the near-end through a far-end echo channel, and this process is the estimation of a downlink echo path characteristic parameter; and when the talk state mode is the far-end talk, the speech signal to be processed is the near-end speech signal, and the source signal of the echo signal is the speech signal transmitted from the far-end, at the moment, estimating the echo path characteristic parameter of the echo signal needs to consider the time delay change and the signal attenuation change when the source signal of the echo signal changes into the echo signal, that is, estimating the path characteristic parameter of the source signal of the echo signal from the loudspeaker to the microphone, and this process is the estimation of an uplink echo path characteristic parameter; thus the echo path characteristic parameter of the echo signal is accurately estimated, and the effect of echo elimination is improved.

Preferably, in order to reduce the calculation amount and shorten the system response time, in this preferred embodiment, a method for considering the time delay of the echo signal when determining the echo path characteristic parameter is provided, for example, since uplink echo elimination and downlink echo elimination are essentially the same, and the difference thereof is that the time delay of the echo signal to be processed by the downlink echo elimination is larger, and accordingly, the number of taps of an adaptive filtering unit required is more, thereby increasing resource consumption and reducing the rate of convergence. The time delay of the echo signal to be processed by the uplink echo elimination comprises the time delay caused by local speech compression coding, and this part is a fixed time delay, which is set as $t_{fix}$, when the number of taps of a filter is designed, this part of time delay may not be considered, and is directly subtracted before designing the number of taps of the filter, and thus taps is not designed alone for the fixed time delay. The time delay of the echo signal to be processed by the downlink echo elimination is codetermined by three parts: 1) near-end processing time; 2) network transmission time; and 3) far-end processing time. The three part time codetermines the time delay of the echo signal to be processed by the downlink echo elimination, wherein 1) near-end processing time and 3) far-end processing time are fixed parts, and 2) network transmission time is variable part; hence, a time delay upper limit $t_{d\ max}$ and a time delay lower limit $t_{d\ min}$ of the echo signal may be determined; when a filter is designed, $t_{d\ min}$ may be considered as the fixed time delay, and before designing the number of the taps of the filter, the fixed time delay is directly subtracted, thereby not designing the taps alone for the fixed time delay. By means of this measure, the calculation amount may be greatly reduced, and the system response time may be shortened.

In order to timely trace the change of the echo path characteristic parameter, in this preferred embodiment, after the echo path characteristic parameter of the echo signal is estimated according to the time delay and the power error, in the case that it is determined the power error between the power of the speech signal to be processed at the previous moment and the power of the speech signal to be processed at the current moment is greater than a preset threshold, the echo path characteristic parameter is updated, wherein the echo path characteristic parameter comprises: an uplink echo path characteristic parameter and/or a downlink echo path characteristic parameter.

In the above-mentioned preferred embodiment, in the case that it is determined the power error between the power of the speech signal to be processed at the previous moment and the power of the speech signal to be processed at the current moment is greater than the preset threshold, it is determined that the echo path has changed. For example, if the time delay of the echo has changed or the signal attenuation has changed, the echo path characteristic parameter needs to be timely changed so as to timely trace the change of the echo path characteristic parameter after the echo path characteristic parameter is accurately estimated, thereby guaranteeing effectively eliminating the echo.

Figure 2:
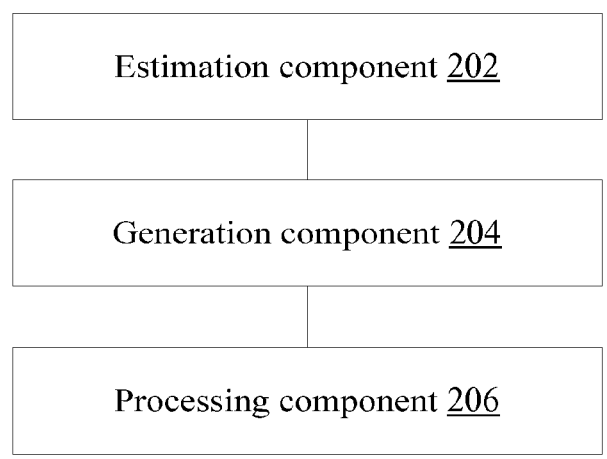
FIG. 2 is a structural block diagram of a device for eliminating echoes according to an embodiment of the disclosure.

This embodiment provides a device for eliminating echoes, as shown in FIG. 2, the device for eliminating echoes comprises: an estimation component 202, configured to estimate an echo path characteristic parameter of an echo signal; a generation component 204, connected to the estimation component 202 and configured to take the source signal of the echo signal as the reference signal, and generate an echo estimation signal according to the echo path characteristic parameter; and a processing component 206, connected to the generation component 204 and configured to subtract the echo estimation signal from a speech signal to be processed.

In the above-mentioned embodiment, the estimation component 202 is configured to estimate the echo path characteristic parameter of the echo signal the generation component 204 is configured to take the source signal of the echo signal as the reference signal and generate the echo estimation signal according to the echo path characteristic parameter, and the processing component 206 is configured to subtract the echo estimation signal from the speech signal to be processed. Through the above solution, the echo path characteristic parameter of the echo signal is estimated timely so as to generate the echo estimation signal, and then the echo estimation signal is subtracted timely and adaptively from the speech signal to be processed so as to eliminate the echo, wherein the above-mentioned echo may either be a downlink echo or an uplink echo; meanwhile, in the disclosure, the purpose of eliminating the echo is achieved by subtracting the echo estimation signal from the speech signal to be processed; therefore, the problem of far-end audio discontinuity due to echo elimination by way of eliminating or weakening the volume of the near-end loudspeaker is solved, thus contributing to improve the speech quality of the conference, and improving the user experience.

In order to improve the practicability of this embodiment, in this preferred embodiment, the above-mentioned speech signal to be processed comprises: a near-end speech signal and/or a speech signal transmitted from the far-end.

Figure 3:
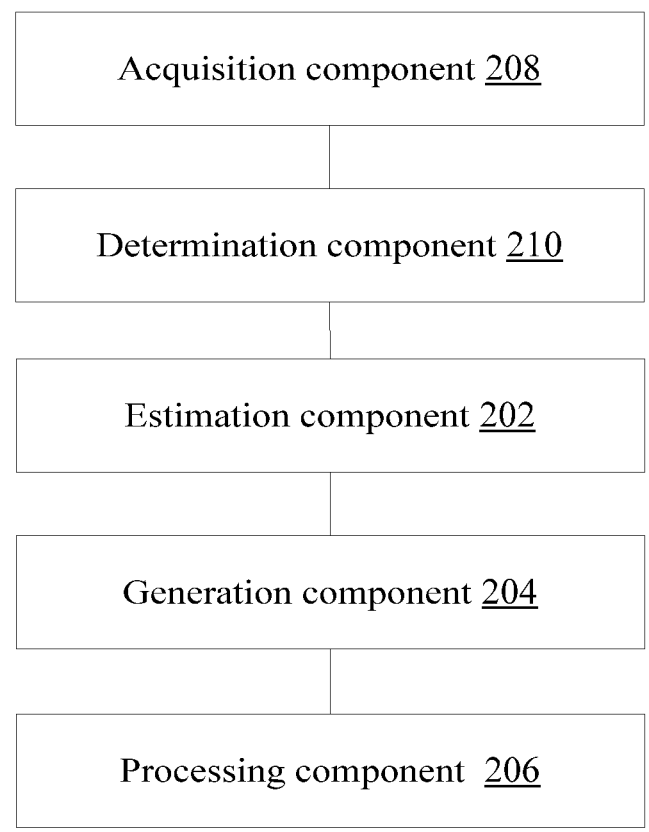
FIG. 3 is a structural block diagram of another device for eliminating echoes according to an embodiment of the disclosure.

In order to accurately estimate the echo path characteristic parameter of the echo signal, in this preferred embodiment, as shown in FIG. 3, the above-mentioned device for eliminating echoes further comprises: an acquisition component 208, configured to obtain a short time energy estimation value of the near-end speech signal and the short time energy estimation value of the speech signal transmitted from the far-end in preset duration; and a determination component 210, connected to the acquisition component 208 and configured to determine a talk state mode according to the size of the short time energy estimation value of the near-end speech signal and the size of the short time energy estimation value of the speech signal transmitted from the far-end, wherein the talk state mode comprises a near-end talk and a far-end talk.

Figure 4:
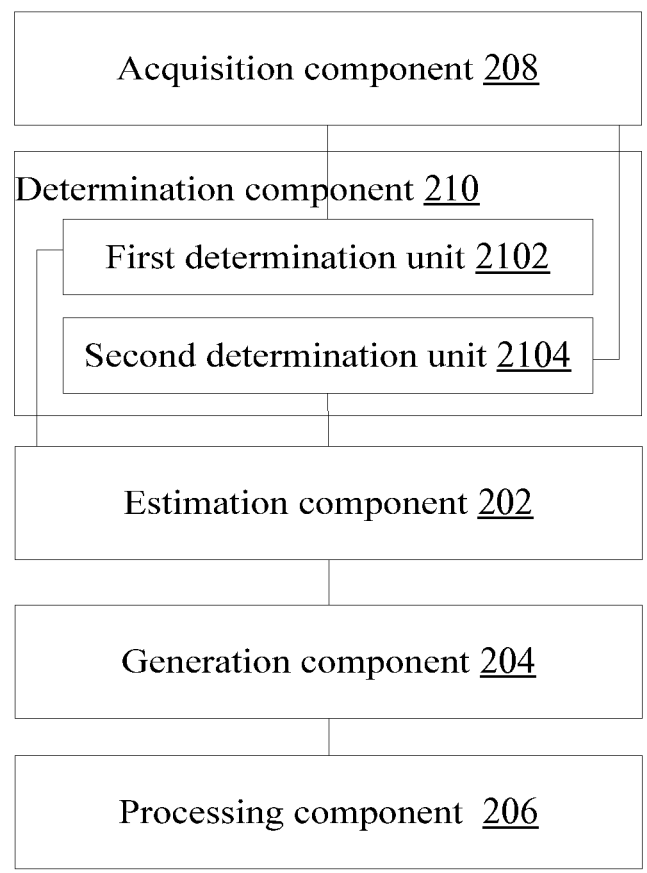
FIG. 4 is a structural block diagram of a determination component according to an embodiment of the disclosure.

In order to accurately determine the talk state mode, in this preferred embodiment, as shown in FIG. 4, the above-mentioned determination component 210 comprises: a first determination unit 2102, configured to determine that the talk state mode is the near-end talk, and the signal to be processed is the speech signal transmitted from the far-end in the case that the short time energy estimation value of the near-end speech signal is greater than a preset multiple of the short time energy estimation value of the speech signal transmitted from the far-end in the preset duration; and a second determination unit 2104, configured to determine that the talk state mode is the far-end talk, and the signal to be processed is the near-end speech signal in the case that the short time energy estimation value of the near-end speech signal is not greater than the preset multiple of the short time energy estimation value of the speech signal transmitted from the far-end in the preset duration.

Figure 5:
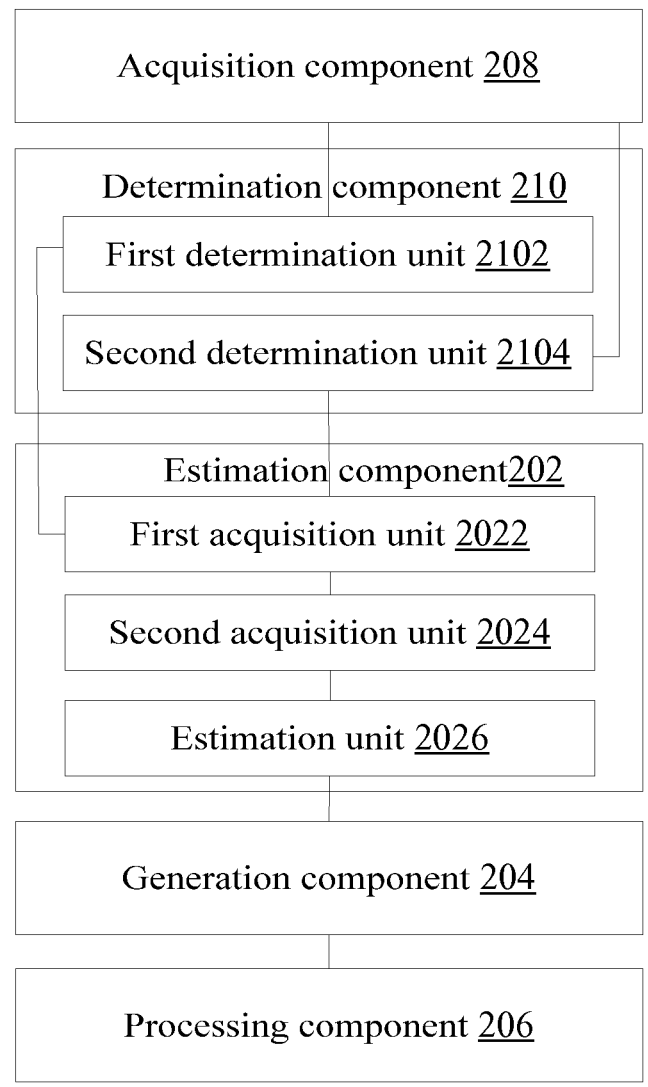
FIG. 5 is a structural block diagram of an estimation component according to an embodiment of the disclosure.

In order to improve the effect of echo elimination and accurately estimate the echo path characteristic parameter of the echo signal, in this preferred embodiment, as shown in FIG. 5, the above-mentioned estimation component 202 comprises: a first determination unit 2022, configured to obtain the time delay of the echo signal in the speech signal to be processed; a second acquisition unit 2024, configured to obtain a power error between a power of the speech signal to be processed at the previous moment and a power of the speech signal to be processed at the current moment; an estimation unit 2026 connected to the first determination unit 2022 and the second acquisition unit 2024 and configured to estimate the echo path characteristic parameter of the echo signal according to the time delay and the power error.

Figure 6:
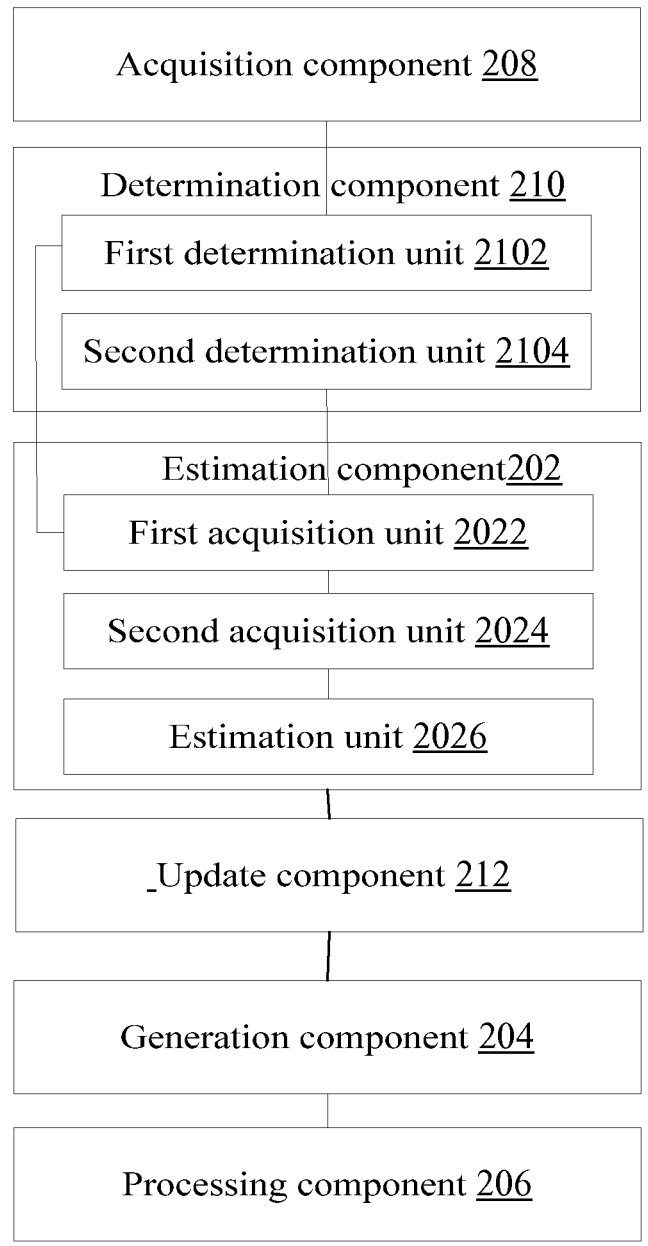
FIG. 6 is a structural block diagram of another device for eliminating echoes according to an embodiment of the disclosure.

In order to timely trace the change of the echo path characteristic parameter, in this preferred embodiment, as shown in FIG. 6, the above-mentioned device for eliminating echoes further comprises: an update component 212, configured to update the echo path characteristic parameter in the case that it is determined the power error between a power of the speech signal to be processed at the previous moment and a power of the speech signal to be processed at the current moment is greater than a preset threshold, wherein the echo path characteristic parameter comprises: an uplink echo path characteristic parameter and/or a downlink echo path characteristic parameter.

The above-mentioned preferred embodiments will be described in detail below in conjunction with the accompanying drawings and examples.

Figure 7:
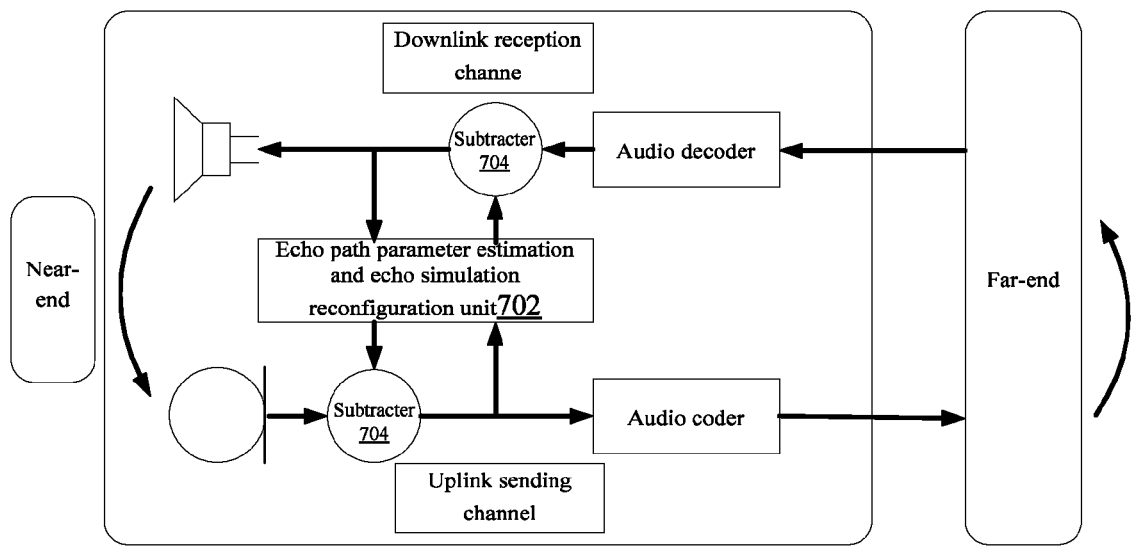
FIG. 7 is a functional schematic diagram of an echo elimination system according to an embodiment of the disclosure.

As shown in FIG. 7, the process of completing the echo elimination by the above-mentioned device for eliminating echoes may be realized through an echo path parameter estimation and echo simulation reconfiguration unit 702 and a subtracter 704, wherein the echo path parameter estimation and echo simulation reconfiguration unit 702 are equivalent to the above-mentioned estimation component 202, the generation component 204, the acquisition component 208, the determination component 210 and the update component 212, and the subtracter 704 is equivalent to the processing component 206; by way of using the device, the elimination of the uplink echo and/or the downlink echo may be completed. For example, when the talk state mode is the near-end talk, the speech signal to be processed is the speech signal transmitted from the far-end, and the source signal of the echo signal is the near-end speed signal, estimating the echo path characteristic parameter of the echo signal needs to consider a time delay change and a signal attenuation change when the source signal of the echo signal changes into the echo signal, that is, estimating the path characteristic parameter of the source signal of the echo signal in the process that the source signal of the echo signal is transmitted to the far-end through an uplink sending channel and then returned to the near-end through a far-end echo channel, and this process is the estimation of a downlink echo path characteristic parameter; then, the near-end speech signal is taken as the reference signal, and the echo estimation signal is generated according to the downlink echo path characteristic parameter; finally, the echo estimation signal is subtracted from the speech signal transmitted from the far-end, so as to eliminating the downlink echo; and when the talk state mode is the far-end talk, the speech signal to be processed is the near-end speech signal, and the source signal of the echo signal is the speech signal transmitted from the far-end, at the moment, estimating the echo path characteristic parameter of the echo signal needs to consider the time delay change and the signal attenuation change when the source signal of the echo signal changes into the echo signal, that is, estimating the path characteristic parameter of the source signal of the echo signal from the loudspeaker to the microphone, and this process is the estimation of an uplink echo path characteristic parameter; then, taking the speech signal transmitted from the far-end as the reference signal, and generating the echo estimation signal according to the uplink echo path characteristic parameter; finally, subtracting the echo estimation signal from the near-end speech signal, so as to eliminating the downlink echo.

Figure 8:
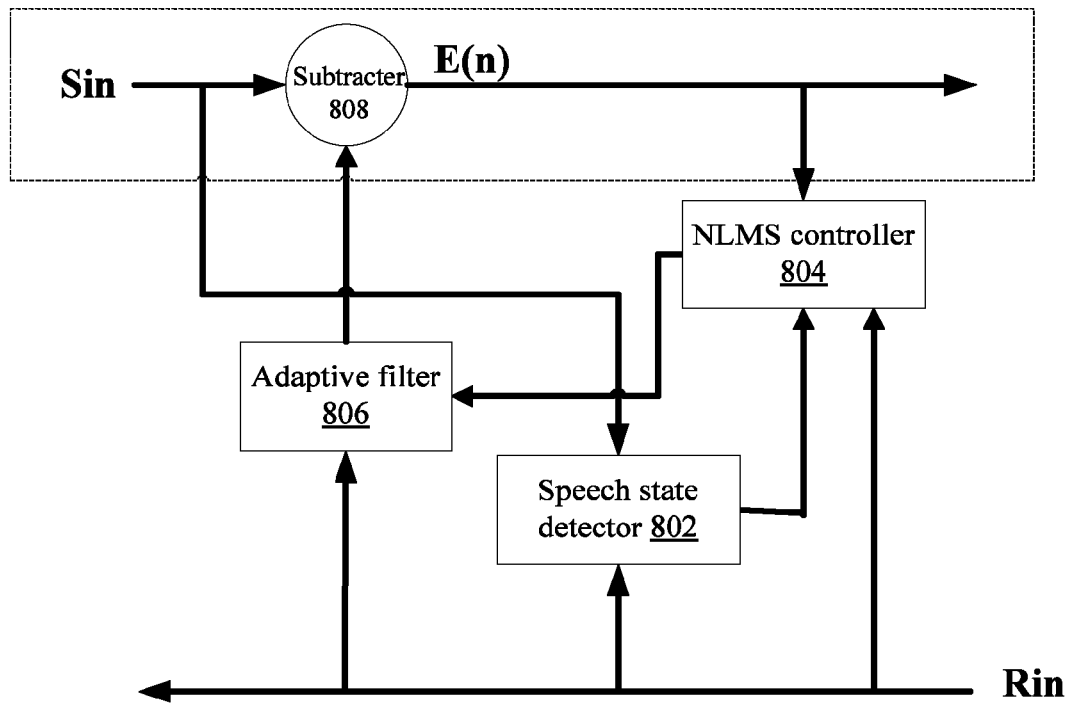
FIG. 8 is a functional block diagram of a device for eliminating echoes according to an embodiment of the disclosure.

In this example, the device for eliminating echoes may be designed according to the requirements of the ITU-T G.168 standard. The basis idea of the working of the device for eliminating echoes is: the echo path characteristic parameter of the echo signal is estimated so as to generate a simulated echo estimation signal, and the echo estimation signal is subtracted from the received signal to be processed so as to realize echo elimination. In order to facilitate the uniform statement of the uplink echo and the downlink echo, in this example, the signal to be processed containing the echo signal is called $S_{in}$, and the source signal generating the echo signal is called $R_{in}$; for the uplink echo elimination, $S_{in}$ refers to the near-end speech signal, and $R_{in}$ refers to the speech signal transmitted from the far-end; and for the downlink echo elimination, $S_{in}$ refers to the speech signal transmitted from the far-end, and $R_{in}$ refers to the near-end speech signal. As shown in FIG. 8, the above-mentioned device for eliminating echoes may include the following parts: a speech state detector 802 (equivalent to the acquisition component 208 and the determination component 210); an NLMS (adaptive) controller 804 (equivalent to the estimation component 202); an adaptive filter 806 (equivalent to the generation component 204) and a subtracter 808 (equivalent to the processing component 206). The above-mentioned speech state detector 802, NLMS (adaptive)

controller 804 and adaptive filter 806 are integrally equivalent to the echo path parameter estimation and echo simulation reconfiguration unit 702 in FIG. 7 (that is, the echo path parameter estimation and the echo simulation reconfiguration unit do not include the part within the dashed box of FIG. 8), and the above-mentioned parts eliminate the echo through the following communications.

Firstly, the speech state detector 802 detects a talk state mode of the current network according to the sizes of signal powers of the $S_{in}$ and $R_{in}$ at different time windows, wherein the talk state mode comprises a near-end talk and a far-end talk, at the same time, the speech state detector 802 notifies the acquired signals $S_{in}$ and $R_{in}$ to the NLMS controller 804; the NLMS controller 804, according to the size E(n) of a power error signal of the signal $S_{in}$ in a filter of the previous moment and the current moment and a time delay of the echo signal, estimates the echo path characteristic parameter of the echo signal, and transmits the echo path characteristic parameter to the adaptive filter 806; the adaptive filter 806 configures coefficients according the echo path characteristic parameter. For example, the coefficients may be a tap coefficient of the filter, a series coefficient of the filter, etc. The adaptive filter 806 generates an echo estimation signal according to the configured coefficients by taking a source signal $R_{in}$ of the echo signal as a reference signal; and finally, the subtracter 808 subtracts the generated echo estimation signal from the signal to be processed $S_{in}$ so as to eliminate the echo.

Preferably, since the echo path is generally time-varying and unknown, using the adaptive filter 806 to simulate the echo estimation signal may accurately estimate the echo path characteristic parameter, and may rapidly trace the change of the echo path characteristic parameter simultaneously.

Figure 9:
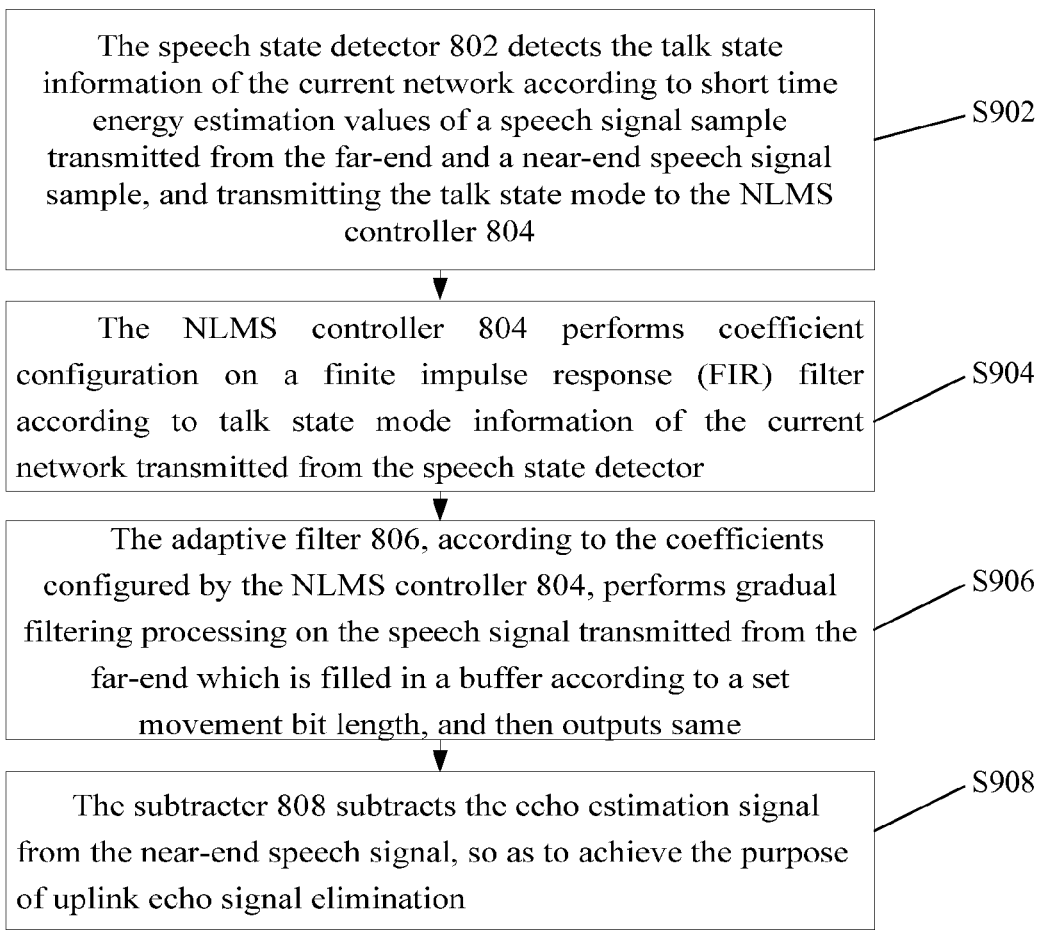
FIG. 9 is a flowchart of a method for eliminating uplink echoes according to an embodiment of the disclosure.

In this example, taking the elimination of the uplink echo for example, the above-mentioned method for eliminating echoes is described in detail; as shown in FIG. 9, the method for eliminating echoes comprises steps S902-S908.

Step S902: the speech state detector 802 samples the speech signal transmitted from the far-end and the near-end speech signal, obtains short time energy estimation values of the speech signal sample transmitted from the far-end and the near-end speech signal sample according to the sampling, determines the talk state mode (information) of the current network according to the size of the short time energy estimation values of the speech signal sample transmitted from the far-end and the near-end speech signal sample, and transmits the talk state mode to the NLMS controller 804.

Preferably, the above-mentioned speech state detector 802 may be realized through a sampling processing component and a talk state judgement component:

the sampling processing component is configured to receive the speech signal transmitted from the far-end and the near-end speech signal, performs sampling processing on the speech signal transmitted from the far-end and the near-end speech signal according to a set interval, and obtains the short time energy estimation value of the speech signal transmitted from the far-end and the short time energy estimation value of the near-end speech signal;

the talk state judgement component is configured to, if the short time energy estimation value of the near-end speech signal sample which is obtained by the sampling processing component is larger than a set multiple of the maximum value of the short time energy estimation value of the speech signal transmitted from the far-end in the above-mentioned set time period, determine that the talk state mode of the current network is the near-end talk mode; otherwise, the talk state judgement component determines that the talk state mode of the current network is the far-end talk mode.

Step S904: the normalized least mean squares (NLMS) controller 804 performs coefficient configuration on a finite impulse response (FIR) filter according to talk state mode information of the current network transmitted from the speech state detector 802; in the case that the talk state information of the current network is the near-end talk mode, the coefficient of a downlink echo elimination adaptive filter is not updated (similarly, in the case that the talk state information of the current network is the far-end talk mode, the coefficient of an uplink echo elimination adaptive filter is not updated). The adaptive algorithm used by the device for eliminating echoes may be an algorithm cluster based on the fastest descent method. A representation of this adaptive algorithm is the least mean squares (LMS) algorithm, and a minimization rule thereof is the root-mean-square error. The NLMS (normalized least mean squares) algorithm is an improved algorithm of the LMS algorithm, which overcomes a defect that the LMS algorithm is sensitive to the input signal energy. The NLMS algorithm and various improved forms thereof are adaptive algorithms mainly adopted in echo eliminators at present. Preferably, the above-mentioned device for eliminating echoes may use the NLMS algorithm.

Step S906: the adaptive filter 806, according to the coefficients configured by the NLMS controller 804, performs gradual filtering processing on the speech signal transmitted from the far-end which is filled in a buffer by taking the source signal of the echo signal as the reference signal and according to a set movement bit length, and then outputs same.

Step S908: the subtracter 808 subtracts the echo estimation signal of the speech signal (the source signal of the echo signal) transmitted from the far-end from the near-end speech signal (the speech signal to be processed), and outputs the processed signal to other components to process.

Preferably, in the above-mentioned device for eliminating echoes, since uplink echo elimination and downlink echo elimination are essentially the same, and the uplink echo elimination and the downlink echo elimination may be set as time-sharing working, the speech state detector 802 needs to ceaselessly and momently determine the speech state. Therefore except for the speech state detector 802, the LMS controller 804 and the adaptive filter 806 may be multiplexed, so as to save digital signal processing (DSP) resources, and the maximum resource consumption thereof depends on the downlink echo elimination.

Obviously, those skilled in the art should know that each of the above-mentioned components or steps of the disclosure can be realized by universal computing apparatus; the components or steps can be focused on a single computing apparatus, or distributed on the network formed by a plurality of computing apparatuses; optionally, they can be realized by the program codes which can be executed by the computing apparatuses; thereby, the components or steps can be stored in a memory apparatus and executed by the computing apparatuses; and under some circumstances, the shown or described steps can be executed in different orders, or can be independently manufactured as each integrated circuit component, or a plurality of components or steps thereof can be manufactured to be single integrated circuit component, thus to be realized. In this way, the disclosure is not restricted to any particular hardware and software combination.

The descriptions above are only the preferable embodiment of the disclosure, which are not used to restrict the disclosure, for a person skilled in the art, the disclosure may have various changes and variations. Any amendments, equivalent substitutions, improvements, etc. within the spirit and principle of the disclosure are all included in the scope of the protection of the disclosure.

What is claimed is:

1. A method for eliminating echoes, comprising:
   estimating at least one echo path characteristic parameter of an echo signal, wherein estimating the at least one echo path characteristic parameter of the echo signal comprises:
   obtaining a time delay of an echo signal in the speech signal to be processed;
   obtaining a power error between a power of the speech signal to be processed at a previous moment and a power of the speech signal to be processed at a current moment; and
   estimating the at least one echo path characteristic parameter of the echo signal according to the time delay and the power error;
   taking a source signal of the echo signal as a reference signal, and generating an echo estimation signal according to the at least one echo path characteristic parameter; and
   subtracting the echo estimation signal from a speech signal to be processed.

2. The method according to claim 1, wherein the speech signal to be processed comprises: a near-end speech signal and/or a speech signal transmitted from a far-end.

3. The method according to claim 1, wherein before estimating the at least one echo path characteristic parameter of the echo signal, the method further comprises: obtaining a short time energy estimation value of the near-end speech signal and a short time energy estimation value of the speech signal transmitted from the far-end in preset duration; and determining a talk state mode according to a size of the short time energy estimation value of the near-end speech signal and a size of the short time energy estimation value of the speech signal transmitted from the far-end, wherein the talk state mode comprises a near-end talk and a far-end talk.

4. The method according to claim 3, wherein determining the talk state mode according to the size of the short time energy estimation value of the near-end speech signal and the size of the short time energy estimation value of the speech signal transmitted from the far-end comprises: determining that the talk state mode is the near-end talk, and the signal to be processed is a speech signal transmitted from the far-end in the case that the short time energy estimation value of the near-end speech signal is greater than a preset multiple of the short time energy estimation value of the speech signal transmitted from the far-end in the preset duration; determining that the talk state mode is the far-end talk, and the signal to be processed is a near-end speech signal in the case that the short time energy estimation value of the near-end speech signal is less than or equal to the preset multiple of the short time energy estimation value of the speech signal transmitted from the far-end in the preset duration.

5. The method according to claim 2, wherein before estimating the at least one echo path characteristic parameter of the echo signal, the method further comprises:
   obtaining a short time energy estimation value of the near-end speech signal and a short time energy estimation value of the speech signal transmitted from the far-end in preset duration; and determining a talk state mode according to a size of the short time energy estimation value of the near-end speech signal and a size of the short time energy estimation value of the speech signal transmitted from the far-end, wherein the talk state mode comprises a near-end talk and a far-end talk.

6. The method according to claim 1, wherein after estimating the at least one echo path characteristic parameter of the echo signal according to the time delay and the power error, the method further comprises: in the case that it is determined that the power error between the power of the speech signal to be processed at the previous moment and the power of the speech signal to be processed at the current moment is greater than a preset threshold, updating the at least one echo path characteristic parameter, wherein the echo path characteristic parameters comprises: an uplink echo path characteristic parameter and/or a downlink echo path characteristic parameter.

7. A device for eliminating echoes, comprising:
   an estimation component stored in a memory and comprising instruction code that is configured to be executable by a computing device processor to estimate at least one echo path characteristic parameter of an echo signal, wherein the estimation component comprises:
   a first acquisition unit configured to obtain a time delay of an echo signal in the speech signal to be processed;
   a second acquisition unit configured to obtain a power error between a power of the speech signal to be processed at a previous moment and a power of the speech signal to be processed at a current moment; and
   an estimation unit configured to estimate the at least one echo path characteristic parameter of the echo signal according to the time delay and the power error;
   a generation component stored in the memory and comprising instruction code that is configured to be executable by the computing device processor to take a source signal of the echo signal as a reference signal, and generate an echo estimation signal according to the at least one echo path characteristic parameter; and
   a processing component stored in the memory and comprising instruction code that is configured to be executable by the computing device processor to subtract the echo estimation signal from a speech signal to be processed.

8. The device according to claim 7, further comprising: an acquisition component configured to obtain a short time energy estimation value of the near-end speech signal and a short time energy estimation value of the speech signal transmitted from the far-end in preset duration; and a determination component configured to determine a talk state mode according to a size of the short time energy estimation value of the near-end speech signal and a size of the short time energy estimation value of the speech signal transmitted from the far-end, wherein the talk state mode comprises a near-end talk and a far-end talk.

9. The device according to claim 8, wherein the determination component comprises: a first determination unit configured to determine that the talk state mode is the near-end talk, and the signal to be processed is a speech signal transmitted from the far-end in the case that the short time energy estimation value of the near-end speech signal is greater than a preset multiple of the short time energy estimation value of the speech signal transmitted from the far-end in the preset duration; and a second determination unit configured to determine that the talk state mode is the far-end talk, and the signal to be processed is a near-end speech signal in the case that the short time energy estimation value of the near-end speech signal is less than or equal to the preset multiple of the short time energy estimation value of the speech signal transmitted from the far-end in the preset duration.

10. The device according to claim 7, further comprising: an update component configured to update the at least one echo path characteristic parameter in the case that it is determined that the power error between the power of the speech signal to be processed at the previous moment and the power of the speech signal to be processed at the current moment is greater than a preset threshold, wherein the echo path characteristic parameters comprises: an uplink echo path characteristic parameter and/or a downlink echo path characteristic parameter.

* * * * *